(12) United States Patent  (10) Patent No.: US 7,493,432 B2
Fukazawa et al.  (45) Date of Patent: Feb. 17, 2009

(54) STORAGE SYSTEM WITH MEMORIES EACH HAVING DIMMS DAISY-CHAIN CONNECTED TO ONE ANOTHER AND CONTROL METHOD THEREOF

(75) Inventors: Tatsuhiko Fukazawa, Odawara (JP); Seiichi Abe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 11/604,683

(22) Filed: Nov. 28, 2006

(65) Prior Publication Data

US 2008/0147932 A1  Jun. 19, 2008

(30) Foreign Application Priority Data

Oct. 16, 2006  (JP)  ............................. 2006-281691

(51) Int. Cl.
*G06F 13/12*  (2006.01)
*G06F 11/00*  (2006.01)
(52) U.S. Cl. ..................... 710/74; 714/1; 714/2; 714/6; 714/100
(58) Field of Classification Search ................... 710/74; 714/1, 2, 6, 100
See application file for complete search history.

(56) References Cited

U.S. PATENT DOCUMENTS 6,681,339 B2 *   1/2004  McKean et al. ................. 714/5
2001/0001871 A1 *  5/2001  Shrader et al. ............... 711/114

FOREIGN PATENT DOCUMENTS

JP  2004-110503  9/2002
JP  2005-157576  11/2003

OTHER PUBLICATIONS

"Fully Buffered DIMM", Elpida Memory, Inc., http://www.elpida.com, 2007, 2 pages total.

* cited by examiner

*Primary Examiner*—Niketa I Patel
(74) *Attorney, Agent, or Firm*—Reed Smith LLP; Stanley P. Fisher, Esq.; Juan Carlos A. Marquez, Esq.

(57) ABSTRACT

A storage system with excellent failure tolerance is provided. The storage system has redundant controllers. A first controller has a first memory for storing the data read/written from/to a storage device and control information concerning the reading/writing of data in the storage device. A second controller has a second memory for storing the data read/written from/to the storage device and control information concerning the reading/writing of data in the storage device. The first memory is structured so that it can be accessed from the second controller. The second memory is structured so that it can be accessed from the first controller.

9 Claims, 13 Drawing Sheets

FIG.7
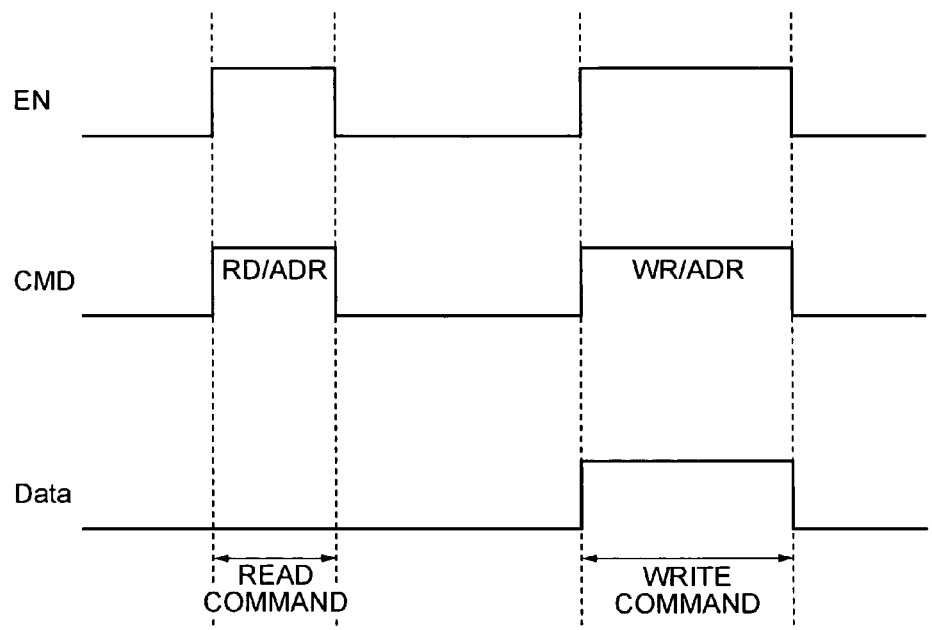
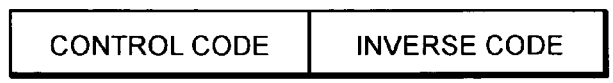
FIG.8A  | CONTROL CODE | INVERSE CODE |
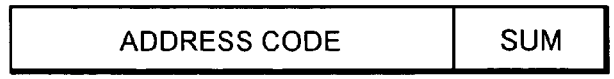
FIG.8B  | ADDRESS CODE | SUM |
FIG.8C  | DMA PARAMETER | CRC |

STORAGE SYSTEM WITH MEMORIES EACH HAVING DIMMS DAISY-CHAIN CONNECTED TO ONE ANOTHER AND CONTROL METHOD THEREOF

CROSS-REFERENCES TO RELATED APPLICATIONS

This application relates to and claims priority from Japanese Patent Application No. 2006-281691, filed on Oct. 16, 2006, the entire disclosure of which is incorporated herein by reference.

BACKGROUND

The present invention relates generally to a storage system that controls the reading/writing of data from/to a storage device in response to requests from a host computer; and a control method for the storage system.

Recently, the amount of data handled by computer systems has increased dramatically. For storage systems managing such a large amount of data, large-scale storage systems, such as those called midrange class or enterprise class storage systems, where data is controlled by a RAID (Redundant Arrays of Inexpensive Disks) system providing huge storage resources, have been a focus of attention.

For these large-scale storage systems, it is essential to enhance the data transfer speed by disk array controllers that control the reading/writing of data from/to the storage devices in response to requests from host computers. For example, Japanese Patent Publication No. 2005-157576 proposes a data processing apparatus where a selector switches paths on a priority basis according to the types of data.

Also, it is desirable for these large-scale storage systems to prevent performance degradation by avoiding concentration of accesses to cache memories that temporarily store the data read/written by the storage devices. For example, Japanese Patent Publication No. 2004-110503 proposes a storage system where each of two channel controllers—that control communication between a storage system and host computers—has a cache memory and these cache memories in the channel controllers are connected to each other via a dedicated data transfer path.

Conventional storage systems, however, have the following problems.

First, sharing the control information in the local memory in a controller with another controller is based on the premise that each controller operates normally so, when a failure occurs in either controller, sharing can no longer be realized.

Conventionally, sharing of the control information involves sharing only some parts of the control information. If all the control information can be shared, complicated operations become possible because the amount of shared information increases and, consequently, high-functionality storage systems, as opposed to conventional storage systems, can be provided. One conceivable technique is to share the control information among the respective cache memories.

However, perfect sharing of the control information among the different systems requires a memory capacity for storing information that has not been shared so far, and accordingly, a large-capacity cache memory for storing such a large-capacity control information is essential. Moreover, in a conventional system, because the amount of data transferred by DMA transfer via paths between other controllers to share data increases, the system performance degrades.

Moreover, when storing the control information that has been stored in a local memory in a cache memory, the physical distance between a CPU and the cache memory becomes long and, as a result of the latency in the data controller, data transmission between the CPU and the cache memory requires a lot of time.

Second, regarding the enhancement of the controller's operation speed, because of the recent refined LSI manufacturing process, wiring delay influences are more evident than gate delay influences. Moreover, in keeping with the tendency toward high-functionality and large-scale LSIs, the number of internal blocks increases and, in order to connect these internal blocks with an internal bus, the number of fan-outs and the length of wires also increase. Because of these reasons, there is a limit to enhancing the operation speed of LSIs and the packaging layout becomes difficult. Japanese Patent No. 2005-157576 does not mention wiring constraints in the data paths between the internal selectors, so it is not a technique for fundamentally solving the aforementioned problems.

Third, regarding system reliability, in a system having a CPU unit with a data protection function, when a failure occurs the CPU unit, system reliability is secured by reporting the failure occurrence to the controller and stopping the operation of the controller so as to prevent malfunctioning of the controller.

Such a method as the one above has demerits in that wires for data protection, such as parity, have to be added in LSIs and that processing becomes complicated because of the need to verify the correctness of data. In light of these circumstances, some recent storage systems do not have data protection functions. When a failure occurs in such storage systems, incorrect data is written in controllers and consequently, data is written in unexpected storage areas such as cache memory and storage devices. Moreover, this error spreads to other controllers, also makes redundant controllers—provided for high reliability—malfunction, resulting in a serious problem in the entire storage system.

This invention aims to provide a high-functionality storage system with excellent failure tolerance that can solve the foregoing problems; and a method for controlling the storage system.

SUMMARY

In order to achieve the foregoing object, this invention provides a storage system having a first controller and a second controller for controlling the reading/writing of data from/to a storage device in response to a request from a host computer. The first controller has a first memory for storing the data read/written from/to the storage device, and control information concerning the reading/writing of data from/to the storage device. The second controller has a second memory for storing the data read/written from/to the storage device, and control information concerning the reading/writing of data from/to the storage device. The first memory can be accessed from the second controller. The second memory can be accessed from the first controller.

This structure provides improved failure tolerance because, even when a failure occurs in the first controller, the second controller accesses the first memory in place of the first controller and performs the task the first controller was performing. While, in conventional storage systems, the control information is partially stored in the cache memory so as to be shared among a plurality of controllers, there is no such need with this invention and so the memory capacity can be used efficiently.

Each of the first and second memories has a plurality of DIMMs daisy-chain connected to one another.

This structure allows access to a memory in one controller from other controllers.

The first memory has a first selector for selecting a controller that can access the first memory from among the first controller and the second controller, in accordance with the presence or absence of a failure in the first controller. The second memory has a second selector for selecting a controller that can access the second memory from among the first controller and the second controller in accordance with the presence or absence of a failure in the second controller.

This structure provides improved failure tolerance because, even when a failure occurs in the first controller, the second controller can access the first memory via the first selector.

The first controller has a first data controller for controlling the transfer of data between a plurality of first peripheral devices (e.g., CPU, bridge, memory, host interface controller, drive interface controller, etc.) inside the first controller. The first data controller has a plurality of first logical blocks for controlling interfaces between the first peripheral devices and the first data controller. Each of the first logical blocks is point-to-point connected to the adjacent first logical blocks, thereby forming a first ring path for transferring data.

The second controller has a second data controller for controlling the transfer of data between a plurality of second peripheral devices inside the second controller. The second data controller has a plurality of second logical blocks for controlling interfaces between the second peripheral devices and the second data controller. Each of the second logical blocks is point-to-point connected to the adjacent second logical blocks, thereby forming a second ring path for transferring data;

Direct connection between a data transfer source logical block and a data transfer destination logical block increases the wiring delay influence and limits the speed enhancement of the operating frequency. On the other hand, according to this invention, because the logical blocks are point-to-point connected to one another, they are physically connected over short distances, which minimizes the influence of the wiring delay even with a high-speed internal operating frequency, and enables high-speed data transfer. Accordingly, even if the entire transfer distance is long, the time for data transfer can be reduced.

The first data controller has a first path which is a shortcut the first data controller can take instead of the first ring path. The second data controller has a second path which is a shortcut the second data controller can take instead of the second ring path.

This structure provides improved data transfer efficiency because, when the ring paths are bearing heavy loads, the controllers can avoid these ring paths and take shortcuts.

The first data controller has a plurality of first ring paths having different data transfer directions. The second data controller has a plurality of second ring paths having different data transfer directions.

This structure provides improved data transfer efficiency because, for example, when a clockwise ring path is occupied, a counterclockwise ring path can be used. Moreover, when transferring data from a transfer source logical block to a transfer destination logical block, for example, if the transfer distance is shorter when transferring the data through the clockwise ring path than when transferring it through the counterclockwise ring path, the positional relationships between the transfer source logical block and the transfer destination logical block are analyzed upon securing the ring path for transferring data so that the ring path enabling the most efficient transfer can be selected.

The first controller further has a first module having a first CPU and its peripheral devices (e.g., CPU, bridge, memory, host interface controller, drive interface controller, etc.), the first CPU controlling the reading/writing of data from/to the storage device in response to a request from the host computer. When a failure occurs in the first controller, the second controller can access the first memory after the first module is removed.

The second controller further has a second module having a second CPU and its peripheral devices (e.g., CPU, bridge, memory, host interface controller, drive interface controller, etc.), the second CPU controlling the reading/writing of data from/to the storage device in response to a request from the host computer. When a failure occurs in the second controller, the first controller can access the second memory after the second module is removed.

This structure enables easy maintenance and management of the storage system because, when a failure occurs in the first controller, the second controller accesses, after the first module in the first controller has been removed, the first memory in place of the first controller and performs the task the first controller was performing.

The first controller has: a first CPU for controlling the reading/writing of data from/to the storage device in response to a request from the host computer; and a first data controller for controlling the transfer of data between a plurality of first peripheral devices (e.g., CPU, bridge, memory, host interface controller, drive interface controller, etc.) in the first controller. The first data controller has a first check circuit for checking whether or not the data transferred from the first CPU to the first data controller is garbled.

The second controller has: a second CPU for controlling the reading/writing of data from/to the storage device in response to a request from the host computer; and a second data controller for controlling the transfer of data between a plurality of second peripheral devices in the second controller. The second data controller has a second check circuit for checking whether or not the data transferred from the second CPU to the second data controller is garbled.

This structure can improve the reliability of the storage system because whether or not the data to be transferred from the CPUs to the data controllers is garbled is checked by the data controllers.

This invention also provides a method for controlling a storage system that has: a first controller for controlling the reading/writing of data from/to a storage device according to a request from a host computer, the first controller having a first memory for storing the data read/written from/to the storage device and control information concerning the reading/writing of data from/to the storage device; and a second controller for controlling the reading/writing of data from/to the storage device according to a request from the host computer, the second controller having a second memory for storing the data read/written from/to the storage device and control information concerning the reading/writing of data from/to the storage device. This method includes steps of: detecting the occurrence of a failure in the first controller; and the second controller accessing the first memory and performing the task the first controller was performing.

This method provides improved failure tolerance because, even if a failure occurs in the first controller, the second controller accesses the first memory in place of the first controller and performs the task the first controller was performing.

This invention can improve the multifunctionality and failure tolerance of the storage system.

BRIEF DESCRIPTION OF THE DRAWINGS

FIG. 7 is an explanatory diagram of an enabling signal, command, and data transmitted between internal interfaces, according to this embodiment.

FIG. 8A-8C are explanatory diagrams of a control code, address code, and DMA parameter according to this embodiment.

DETAILED DESCRIPTION OF PREFERRED EMBODIMENTS

An embodiment of this invention is explained below with reference to the drawings. The following embodiment does not limit the scope of the invention described in the claims and not all the combinations of the features explained in this embodiment are essential to achieve the foregoing object of this invention.

Figure 1:
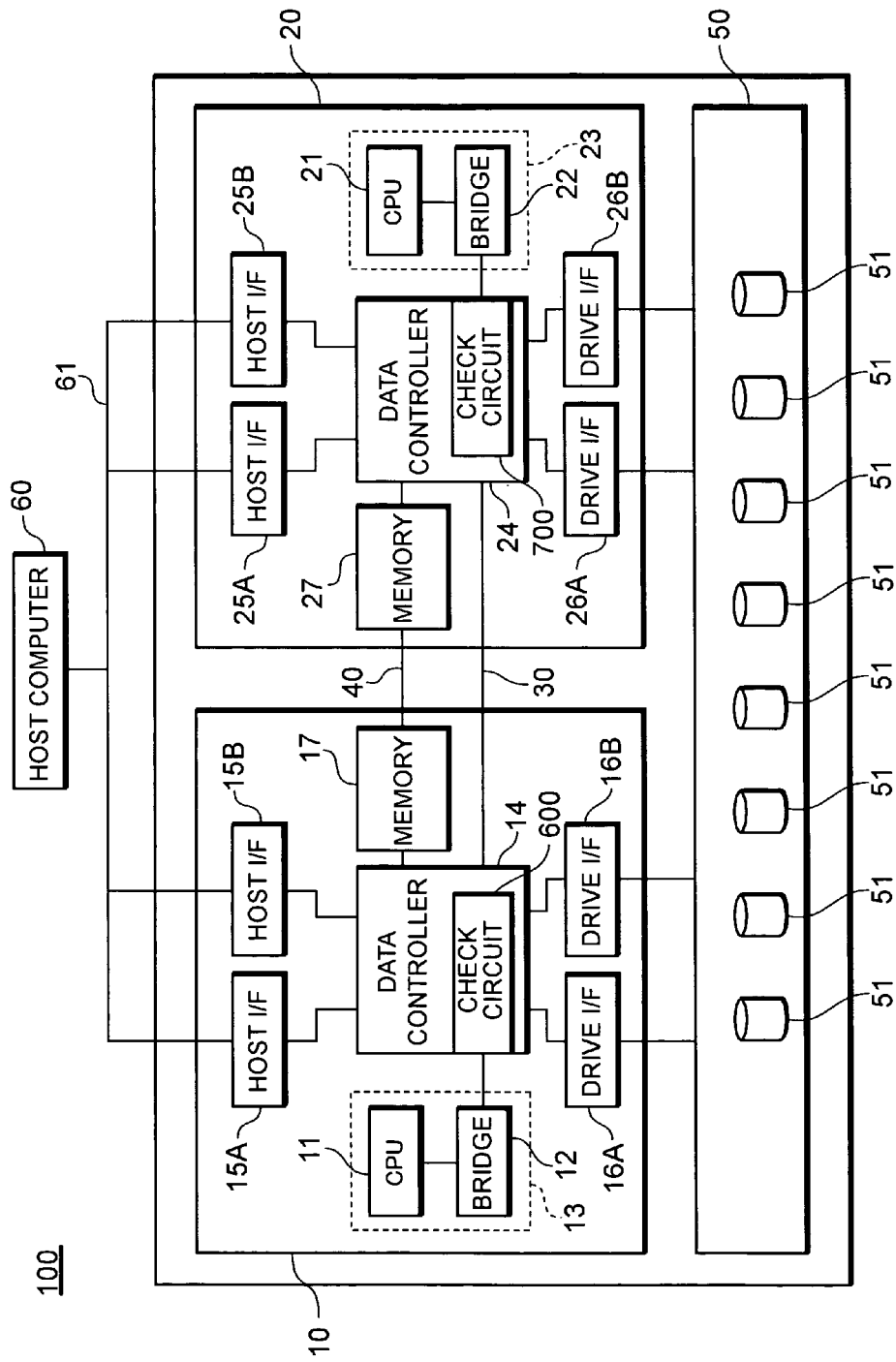
FIG. 1 is a diagram showing the hardware structure of a storage system according to an embodiment of this invention.

FIG. 1 shows the hardware structure of a storage system 100 according to this embodiment. The storage system 100 is connected to one or more host computers 60 via a communication network 61. The host computer 60 is a personal computer, work station or mainframe. The host computer 60 is equipped with, for example, Web application software, streaming application software, e-business application software, etc.

Examples of the communication network 61 include a SAN (Storage Area Network), LAN (Local Area Network), WAN (Wide Area Network), the Internet, a private line and a public line. When the host computer 60 is connected to the storage system 100 via a SAN, it requests input/output of data in units of blocks—data management units for the storage resources in the storage system 100—based on protocols such as Fibre Channel Protocol or iSCSI (internet Small Computer System Interface) protocol. Meanwhile, when the host computer 60 is connected to the storage system 100 via a LAN, it requests input/output of data in units of files while designating file names, based on protocols such as NFS (Network File System) or CIFS (Common Interface File System) protocols. In order for the storage system 100 to receive file access requests from the host computer 60, it has to be equipped with a NAS (Network Attached Storage) function.

The storage system 100 has redundant controllers 10 and 20, and a storage apparatus 50.

The storage apparatus 50 includes a plurality of storage devices 51. These storage devices 51 are physical devices such as hard disk drives, flexible disk drives, magnetic tapes, semiconductor memories, flash memories, or optical disk drives. When the storage devices 51 are hard disk drives, various types of disk drives such as FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SCSI (Small Computer System Interface) disk drives, and SAS (Serial Attached SCSI) disk drives can be used.

The controllers 10 and 20 may control the storage devices 51 based on a RAID level (e.g., 0, 1, or 5) regulated by a RAID system. One or more logical units—access units for the host computer 60—are defined for one RAID group. Each logical unit is assigned a LUN (Logical Unit Number).

The controller 10 has a CPU unit 13, data controller 14, host interface controllers 15A and 15B, drive interface controllers 16A and 16B, memory 17, and check circuit 600.

The CPU unit 13 has a CPU 11 and bridge 12. The CPU 11 is a processor that controls the I/O (write accesses and read accesses) to the storage apparatus 50 in response to the data input/output requests from the host computer 60. The bridge 12 connects the CPU 11 with data controller 14.

The data controller 14 connects the CPU unit 13, host interface controllers 15A and 15B, drive interface controllers 16A and 16B, and memory 17 to one another, and controls the transfer of data between the host computer 60 and the storage apparatus 50. To be more precise, when the host computer 60 makes a write access, the data controller 14 first writes the write data it receives from the host computer 60 via the host interface controllers 15A and 15B, in the memory 17. Then, the drive interface controllers 16A and 16B write the write data written in the memory 17 in the storage apparatus 50. Meanwhile, when the host computer 60 makes a read access, the data controller 14 writes the read data it reads from the storage apparatus 50 via the drive interface controllers 16A and 16B, in the memory 17, and transfers it to the host interface controllers 15A and 15B.

Incidentally, when the storage apparatus 50 is managed on RAID level 5, the data controller 14 has the function of computing parity data.

The host interface controllers 15A and 15B control the interfaces between the host computer 60 and controller 10 and have functions that receive, for example, Fibre Channel Protocol-based block access requests as well as file transfer protocol-based file access requests from the host computer 60. The drive interface controllers 16A and 16B control the interfaces between the controller 10 and storage apparatus 50 and have functions that control the data input/output requests to the storage apparatus 50 based on, for example, the protocols controlling the storage apparatus 50.

The memory 17 stores: the control information concerning the reading/writing of data from/to the storage devices 51 (such as the information, when data was distributed to a plurality of storage devices 51 according to RAID, which storage devices 51 the distributed pieces of data have been written in, and the information concerning to what extent the distributed pieces of data have been written); and the data read/written from/to the storage apparatus 50.

Details of the check circuit 600 will be given later.

The controller 20 has a CPU unit 23, data controller 24, host interface controllers 25A and 25B, drive interface controllers 26A and 26B, memory 27, and check circuit 700. Because it has the same structure as that of the controller 10, detailed explanations of its respective components are omitted. The CPU unit 23 has a CPU 21 and bridge 22.

The data controllers 14 and 24 are connected to each other via a path 30 and so the data the host computer 60 reads/writes from/to the storage device 51 is written in both memories 17 and 27 via this path 30.

The memories 17 and 27 are connected to each other via a path 40 and each memory can be accessed from both its own controller and the other controllers. For example, the information stored in the memory 17 can be accessed not only from the CPU 11 (its own controller) but also from the CPU 21 (another controller) via the path 40. Likewise, the information stored in the memory 27 can be accessed not only from the CPU 21 (its own controller) but also from the CPU 11 (another controller) via the path 40.

The control information stored in the memories 17 and 27 is the one that had been conventionally stored in local memories. Conventionally, the control information stored in the local memories in the CPU 11 and CPU 21 is copied to the cache memories. However, in this embodiment, it is unnecessary to copy the control information from the local memories to the cache memories because the control information is stored in the memories 17 and 27. Moreover, in conventional techniques, the control information stored in the local memories is transferred to the cache memories in other controllers through the path 30, and this has been a factor reducing the efficiency in data transfer through the path 30 involved in the access from the host computer 60 to the storage apparatus 50. However, in this embodiment, accesses to the control information stored in the memories 17 and 27 can be made through the path 40, enabling efficient use of the band of the path 30.

The detailed structures of the memories 17 and 27 are explained with reference to FIG. 2. The memory 17 is equipped with a plurality of memory modules (e.g., DIMM: Dual Inline Memory Module) 170-0 ... 170-$n$. Each memory module 170-0-170-$n$ has a memory chip (e.g., DRAM: Dynamic Random Access Memory) 171-0-171-$n$; and a memory controller 172-0-172-$n$ for controlling the reading/writing of data from/to the memory chip 171-0-171-$n$. Each memory controller 172-0-172-$n$ has a two-input, two-output I/O interface for daisy-chain connecting the memory controllers in the adjacent memory modules.

Likewise, the memory 27 is equipped with a plurality of memory modules (e.g., DIMM) 270-0 . . . 270-$n$. Each memory module 270-0-270-$n$ has a memory chip (e.g., DRAM) 271-0-271-$n$; and a memory controller 272-0-272-$n$ for controlling the reading/writing of data from/to the memory chip 271-0-271-$n$. Each memory controller 272-0-272-$n$ has a two-input, two-output I/O interface for daisy-chain connecting the memory controllers in the adjacent memory modules.

The memories 17 and 27 are connected to each other via paths 40$a$ and 40$b$. The data controller 14 and the memory 17 are connected to each other via paths 41$a$ and 41$b$ while the data controller 24 and the memory 27 are connected to each other via paths 42$a$ and 42$b$.

Here, access by one controller to its own memory is explained by taking, as an example, a case where the data controller 14 accesses its own memory 17.

When data is to be written in the memory 17, the write data, together with a write command, is transmitted from the data controller 14 to the memory controller 172-0 through the path 41$a$. The memory controller 172-0 receives this write data and, if the write destination address falls within the address range of the memory chip 171-0 the memory controller 172-0 manages, it writes the write data in the memory chip 171-0; however, if the address falls outside the address range of the memory chip 171-0, it transfers the write data, together with the write command, to the next memory controller. Thus, the write data is transferred from one memory controller to another until the memory controller that manages the write destination address is reached.

When data is read from the memory 17, a read command is transmitted from the data controller 14 to the memory controller 172-0 through the path 41$a$. The memory controller 172-0 receives the read command and, if the read source address falls within the address range of the memory chip 171-0 the memory controller 172-0 manages, it reads the relevant data from the memory chip 171-0; however, if the address falls outside the address range of the memory chip 171-0, it transfers the read command to the next memory controller. Thus, the read command is transferred from one memory controller to another until the memory controller that manages the read source address is reached. The read data read from the memory controller is transferred back along the path, in the reverse direction to which the read command had been transferred, to the data controller 14.

Access by a controller to a memory in another controller is explained by taking, as an example, the case where the data controller 14 accesses the memory 27.

When data is to be written in the memory 27, the write data, together with a write command, is transmitted from the data controller 14 to the memory 17 through the path 41$a$. The write data that has been transferred through the memory controllers inside the memory 17 is transferred to the memory controller 272-$n$ in the memory 27 through the path 40$a$. The memory controller 272-$n$ receives the write data and, if the write destination address falls within the address range of the memory chip 271-$n$ the memory controller 272-$n$ manages, it writes the write data in the memory chip 271-$n$; however, if the address falls outside the address range of the memory chip 271-$n$, it transfers the write data, together with the write command, to the next memory controller. Thus, the write data is transferred from one memory controller to another until the memory controller that manages that write destination address is reached.

When data is read from the memory 27, a read command is transmitted from the data controller 14 to the memory 17 through the path 41$a$. The read command that had been transferred through the memory controllers inside the memory 17 is transferred to the memory controller 272-$n$ in the memory 27 through the path 40$a$. The memory controller 272-$n$ receives the read command and, if the read source address falls within the address range of the memory chip 271-$n$ the memory controller 272-$n$ manages, it reads the relevant data from the memory chip 271-$n$; however, if the address falls outside the address range of the memory chip 271-$n$, it transfers the read command to the next memory controller. Thus, the read command is transferred from one memory controller to another until the memory controller that manages the read source address is reached. The read data read from the memory controller is transferred to the controller 10 through the path 40$b$, and to the data controller 14 through the path 41$b$.

Figure 3:
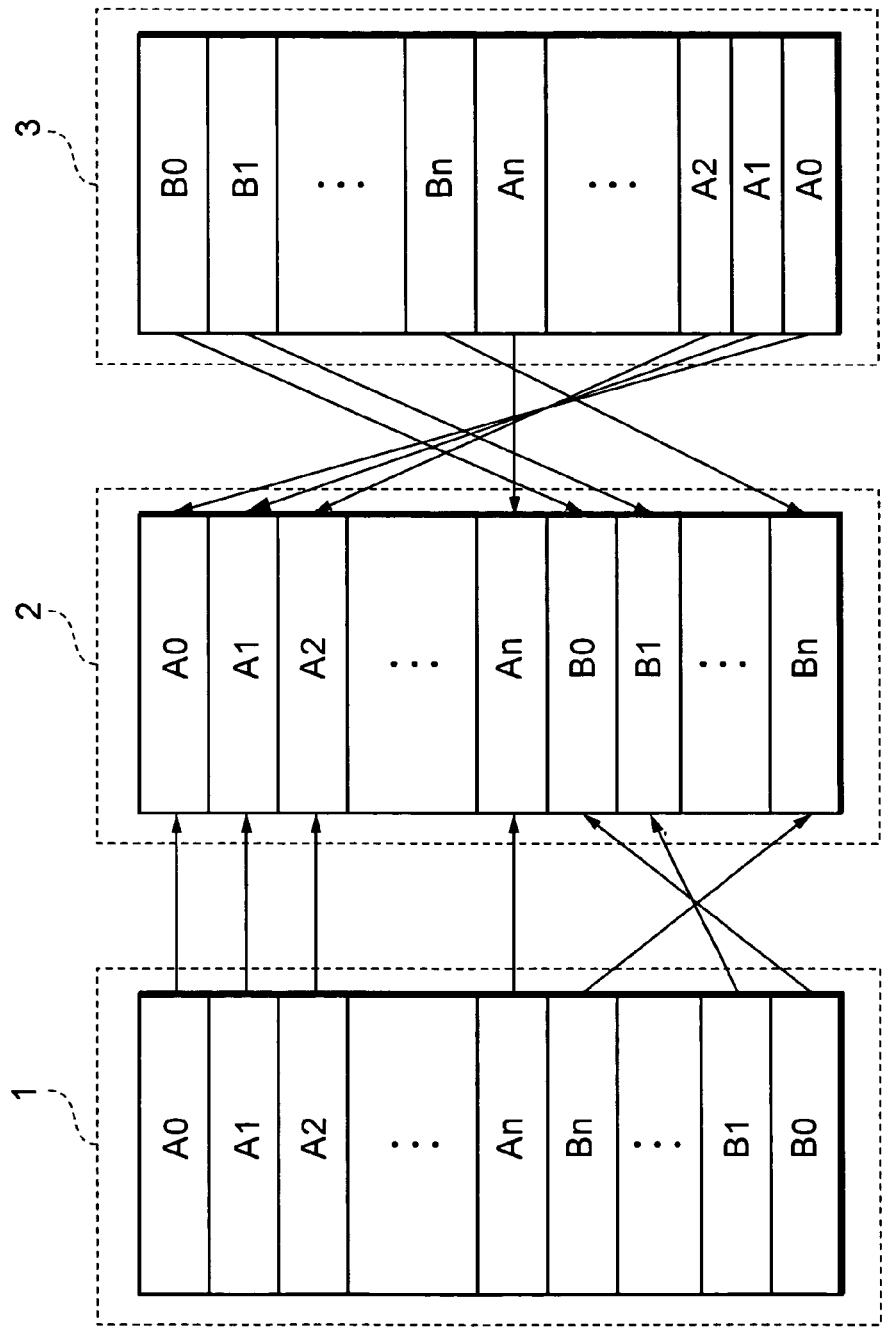
FIG. 3 is an explanatory diagram of an address conversion function according to this embodiment.

Address conversion functions 140 and 240 of the data controllers 14 and 24 are explained with reference to FIG. 3.

Because the order of memory chips a command passes through when transferred from the controller 10 to controller 20 is different from the order of memory chips it passes through when transferred from the controller 20 to controller 10, the address spaces of the memories 17 and 27 seen from the controller 10 are different from the address spaces of the memories 17 and 27 seen from the controller 20. Assuming that the address spaces of the memory chips 171-0-170-*n* are A0-A*n* and the address spaces of the memory chip 271-0-271-*n* are B0-B*n*, the address spaces seen from the controller 10 look like the address space 1 where the memory chips are arranged in the order a command transferred from the controller 10 to controller 20 passes through, while the address spaces seen from the controller 20 look like the address space 2 where the memory chips are arranged in the order a command transferred from the controller 20 to controller 10 passes through.

The address conversion function 140 of the data controller 14 includes the function of mapping the address space 1 onto an address space 2. The address conversion function of the data controller 24 also has the function of mapping an address space 3 onto the address space 2. With these address conversion functions 140 and 240, the address spaces seen from the respective controllers 10 and 20 match, and the controllers 10 and 20 can share a single micro program, which is necessary for controlling memory access. If the address spaces are different between the controllers, each controller has to be equipped with its own corresponding micro program. But, in this embodiment, this inconvenience can be overcome.

Figure 4:
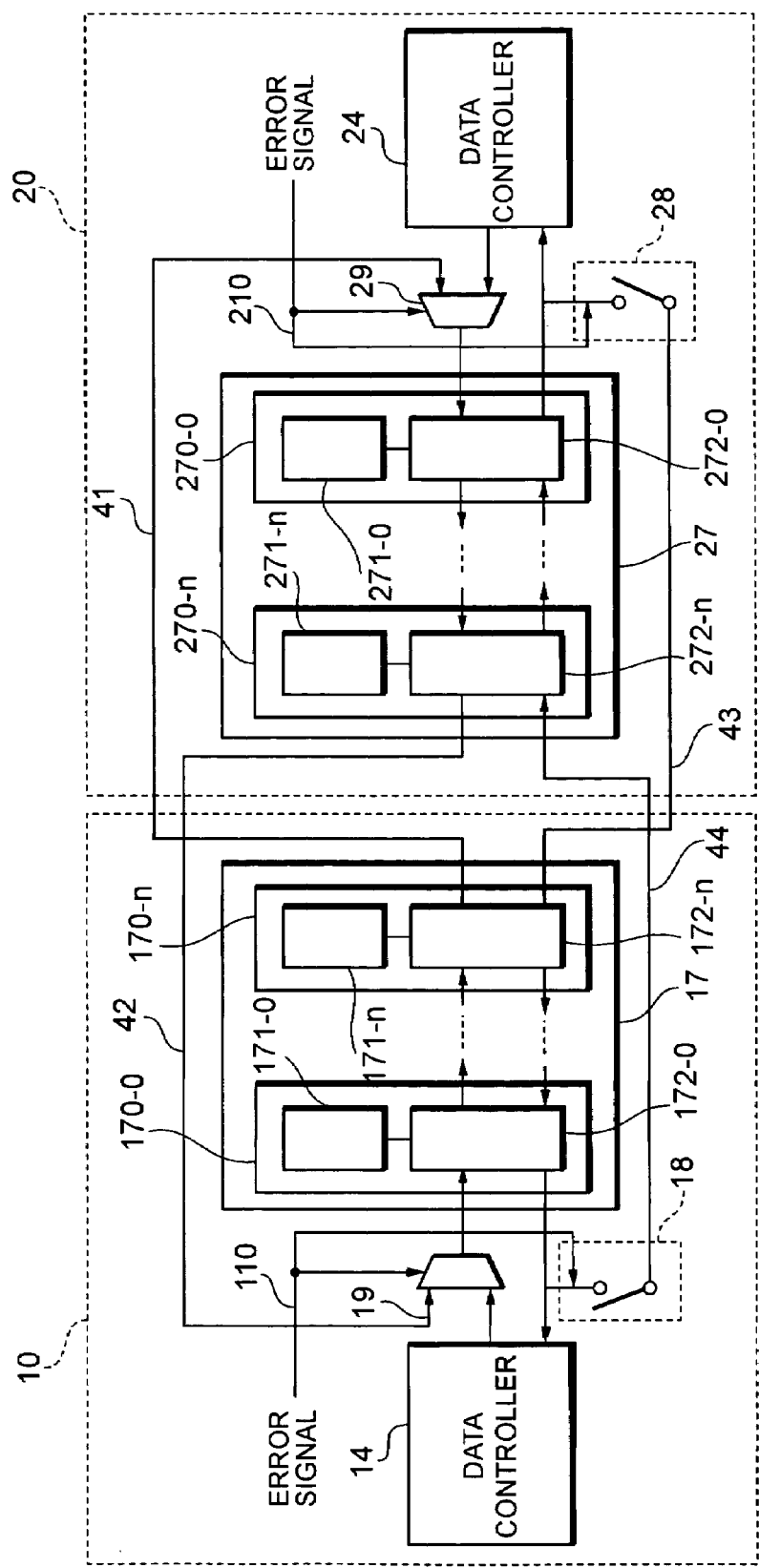
FIG. 4 is an explanatory diagram of another hardware structure of the memory according to this embodiment.

An alternative structure for the paths connecting the memories 17 and 27 is explained with reference to FIG. 4.

Figure 2:
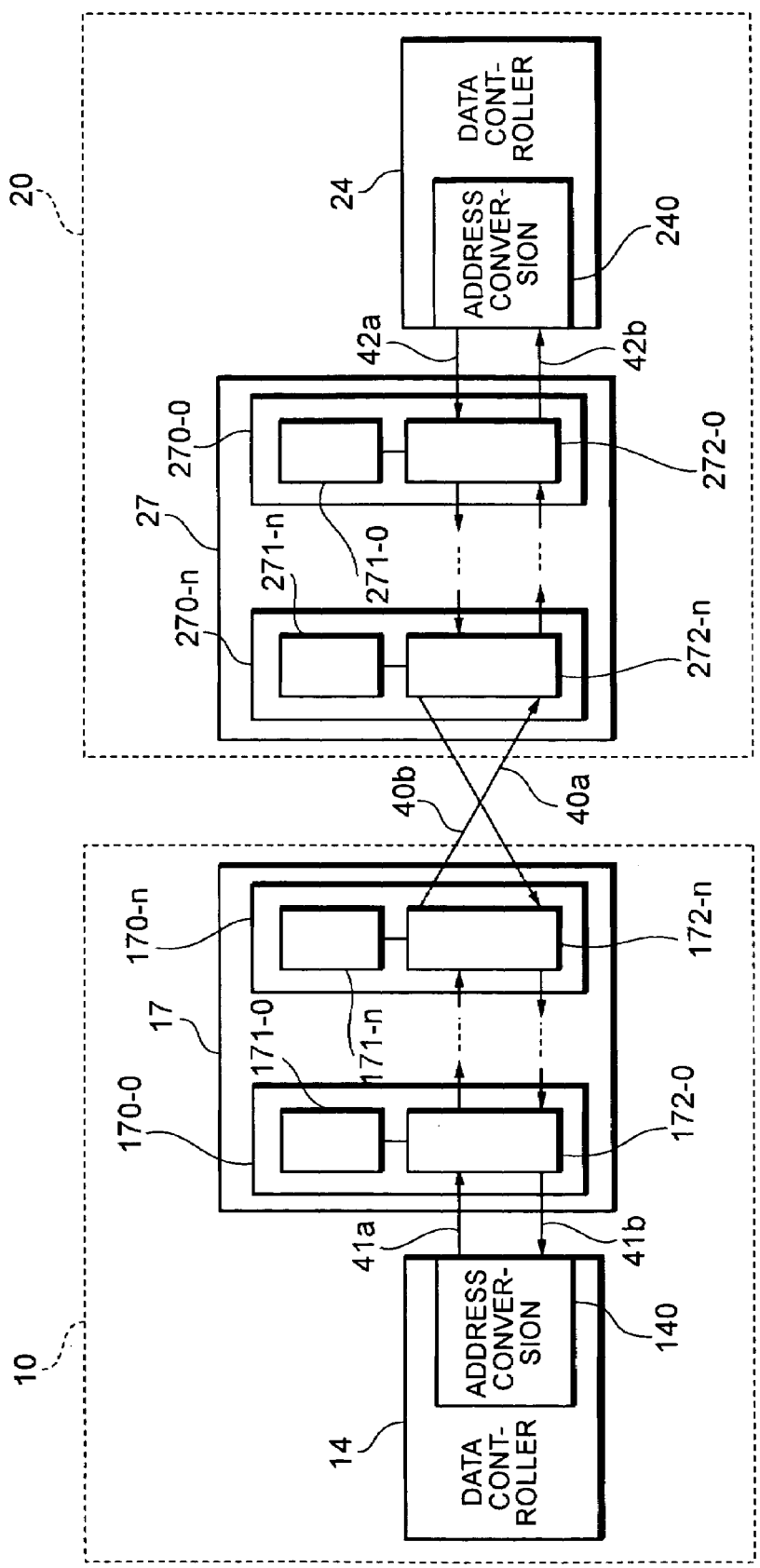
FIG. 2 is an explanatory diagram of the hardware structure of a memory according to this embodiment.

This structure is different from the one in FIG. 2 in that the controller 10 has a selector 19 and switch 18 and the controller 20 has a selector 29 and switch 28. The selector 19 and switch 18 function to switch output signals based on error signals indicating the occurrence of failures in the controller 10. Likewise, the selector 29 and switch 28 function to switch output signals based on error signals indicating the occurrence of failures in the controller 20. The basic procedures by which the data controller 14 reads/writes data from/to the memory 17 and the data controller 24 reads/writes data from/to the memory 27 are the same as the basic procedures by which the data controller 14 reads/writes data from/to the memory 17 and the data controller 24 reads/writes data from/to the memory 27 explained regarding the structure in FIG. 2.

Access to a memory in another controller during the occurrence of failure is explained, by taking, as an example, the case where the data controller 14 accesses the memory 27 when a failure occurs in the controller 20.

First, the case where the controller 10 writes data in the memory 27 is explained. Because the controller 10 is operating normally, the selector 19 outputs a write command received from the data controller 14 to its own memory 17. The write command is transferred through the memory controllers in the memory 17 to the controller 20 through the path 41.

Because a failure has occurred in the controller 20, an error signal is output to a path 210. Then the selector 29 and switch 28 both connected to this path 210 are notified of the failure occurrence. Normally (when no error signal is received), the selector 29 outputs the signals it receives from the data controller 24 to the memory 27. However, during the occurrence of a failure (when an error signal is received), it outputs the signal it receives from the path 41 to the memory 27. The switch 28 is off normally (when no error signal is received), but during the occurrence of a failure (when an error signal is received), it is turned on and outputs the signal it receives from the memory 27 to the path 43.

A read command from the data controller 14 is transferred to the memory 27 via the selector 29. After that, the read command is transferred inside the memory 27 until the memory controller that manages the relevant read source address is reached. The memory controller that manages the read source address reads the relevant data from its memory chip and transfers the read data back along the path, in the reverse direction to which the read command had been transferred. Because the switch 28 is turned on by receiving the error signal, the read data the memory controller 272-0 inputs in the switch 28 is transferred to the controller 10 through the path 43.

The read data is transferred from one memory controller to another inside the memory 17 in the controller 10. Because no problem has occurred in the controller 10, the switch 18 remains off and the read data the memory 17 inputs to the switch 18 is output directly to the data controller 14.

The same procedure as above is followed when a failure occurs in the controller 10 and the controller 20 reads/writes data from/to the memory 17.

Figure 5:
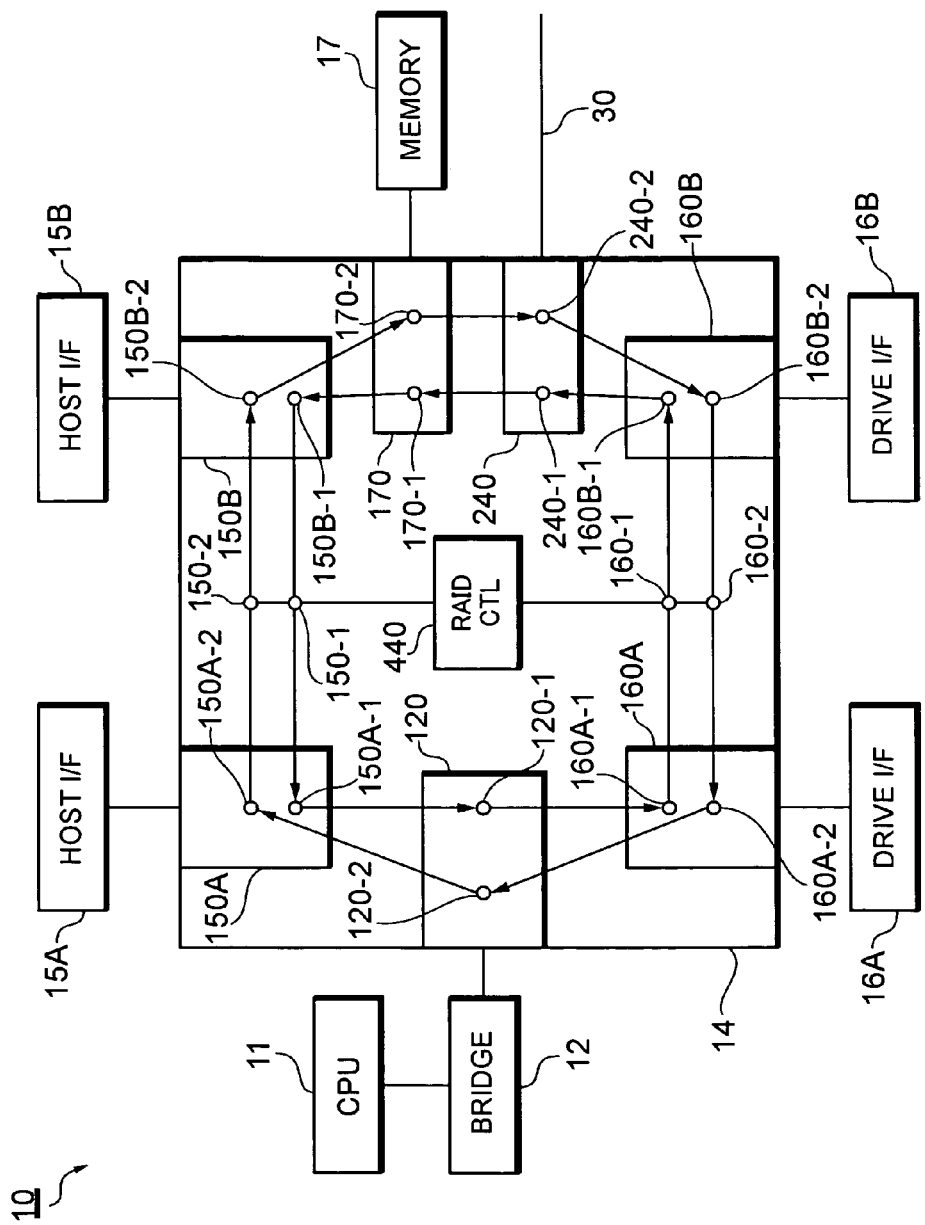
FIG. 5 is a diagram showing the hardware structure of a data controller according to this embodiment.

The detailed structure of the data controller 14 will be explained with reference to FIG. 5. The data controller 14 has logical blocks 120, 150A, 150B, 170, 240, 160B and 160A corresponding to the bridge 12, host interface controllers 15A, 15B, memory 17, data controller 24, and drive interface controllers 16B and 16A, respectively.

The logical blocks 120, 150A, 150B, 170, 240, 160B and 160A each have internal interfaces 120-1 and 120-2, 150A-1 and 150A-2, 150B-1 and 150B-2, 170-1 and 170-2, 240-1 and 240-2, 160B-1 and 160B-2, and 160A-1 and 160A-2 for connection with the internal paths in the controller 14. The internal interfaces 120-1, 150A-1, 150B-1, 170-1, 240-1, 160B-1 and 160A-1 are point-to-point connected in a counterclockwise direction. The internal interfaces 120-2, 150A-2, 150B-2, 170-2, 240-2, 160B-2, and 160A-2 are point-to-point connected in a clockwise direction. Thus, by point-to-point connecting the internal interfaces, redundant ring paths (ring-shaped paths connecting the logical blocks) are provided in the data controller 14.

For ease of explanation, the number of internal interfaces included in one logical block is set to two, but it may be three or more. Also, the number of the ring paths in the data controller 14 may be three or more too.

Inside the data controller 14, data is transferred along either of the ring paths. Data transfer paths inside the data controller 14 are explained by taking as an example the case where the host computer 60 writes data in storage devices 51. The data controller 14 receives write data from the host computer 60 via the host interface controller 15B. This write data is transferred from the internal interface 150B-2 to the internal interface 170-2 and written in the memory 17. Then, the write data is read from the memory 17 and transferred from the internal interface 170-2 to the internal interface 240-2 in a clockwise direction. The internal interface 240-2 judges that the write data is not addressed to itself and transfers it to the next internal interface 160B-2 in the clockwise direction. The internal interface 160B-2 judges that the write data is addressed to itself and transfers it to its corresponding drive interface controller 16B. The drive interface 16B then writes that write data in the relevant storage devices 51.

The arbitration function of the data controller 14 is explained by taking as an example the case where a command from the CPU 11 is sent to the host computer 60 via the host interface controller 15A. Considering the positional relationships between the logical block 120 and the logical block 150A, the transfer distance for the command is shorter when transferring it from the logical block 120 to the logical block 150A along the clockwise ring path than transferring it along the counterclockwise ring path, accordingly, by taking the clockwise ring path, the transfer time can be reduced. The data controller 14 has such an arbitration function, with which it selects the ring path that requires less transfer time by taking into consideration the physical wiring distance between a transfer source logical block and a transfer destination logical block, and transfers data through that ring path.

However, even when the arbitration considering the physical wiring distance between a transfer source logical block and a transfer destination logical block is performed, if the ring path to be used for the transfer of data is already engaged in transferring any other data, the data transfer may not be postponed until that ring path is released, but instead transferred along the ring path which does not provide the shortest transfer distance, depending on the priority assigned to that data.

In addition to the structural components described above, the data controller 14 has a RAID controller 440, internal interfaces 150-1, 150-2, 160-1, and 160-2. When the occupancy frequencies of the ring paths are high and many commands and data are waiting to be transferred, the RAID controller 440 takes a shortcut in the counterclockwise ring path by having the data/commands pass through the internal interfaces 150-1 or 160-1 or, on the clockwise ring path, by having it pass through the internal interface 150-2 or 160-2. This shortcut function improves data transfer efficiency.

Figure 6:
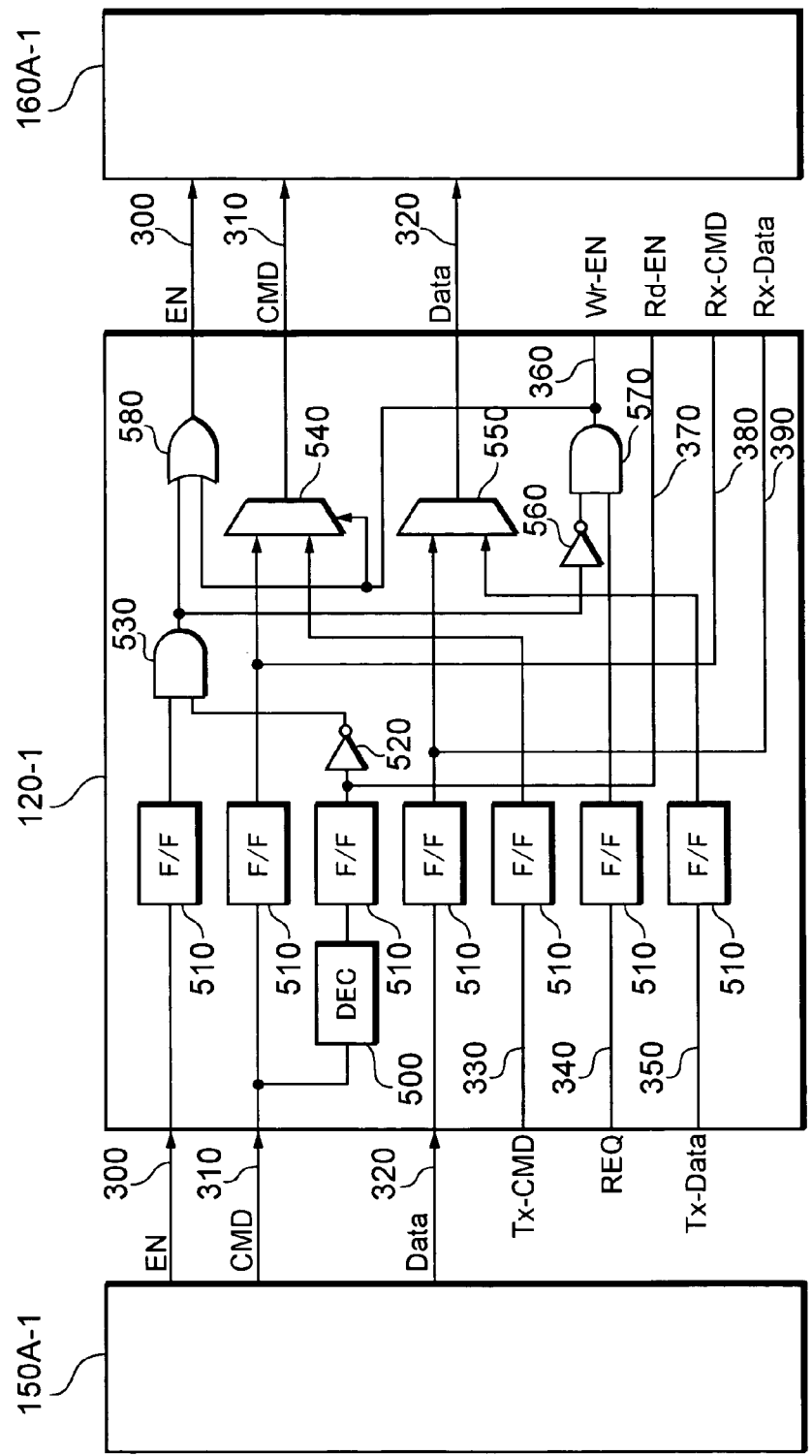
FIG. 6 is a diagram showing the hardware structure of an internal interface according to this embodiment.

The detailed structure of the internal interface 120-1 will be explained with reference to FIG. 6. For ease of explanation, only the detailed structure of the internal interface 120-1 is explained, but the other internal interfaces have the same structure. The internal interface 120-1 is connected to and sandwiched between the internal interface 150A-1 and internal interface 160A-1.

Examples of signals transmitted between the internal interfaces include enabling signals 300, commands 310, and data 320. The level of an enabling signal 300 is raised to a high level when the internal interface receiving that enabling signal 300 is the final destination. Examples of commands 310 include write commands and read commands. Examples of data 320 include write data and read data.

The internal interface 120-1 has a decoder 500, flip-flop 510, inverter 520, AND gate 530, selector 540, selector 550, inverter 560, AND gate 570 and OR gate 580. It judges whether or not the data and/or command it receives from the internal interface 150A-1 is/are addressed to itself; if the command is a write command addressed to itself, raises the level of the write-enabling signal 360 to a high level; if the command is a read command addressed to itself, raises the level of the read-enabling signal 370 to a high level; outputs the received write command or read command to the logical block 120; and outputs the data it received to the logical block 120 as data 390. Meanwhile, if the internal interface 120-1 judges that the data and/or command it received from the internal interface 150A-1 is/are not addressed to itself, it transfers that data and/or command to the next internal interface 160A-1.

When the internal interface 120-1 voluntarily intends to transfer data and/or a command to another internal interface, it transfers the data and/or command to the ring path using a command 330, request 340, and data 350.

Incidentally, an enabling signal 300, command 310 and data 320 are transmitted between the internal interfaces as signals as shown in FIG. 7.

Directly connecting a data transfer source logical block with a data transfer destination logical block is not desirable because it increases the wiring delay influences and thereby limits the speed enhancement of the operating frequency. On the other hand, in this embodiment, because the logical blocks are point-to-point connected to one another, they are physically connected over short distances, which minimizes the influence of the wiring delay even at a high-speed internal operating frequency, enabling high-speed data transfer. Accordingly, even if the entire transfer distance is long, the data transfer time can be lessened.

Figure 9:
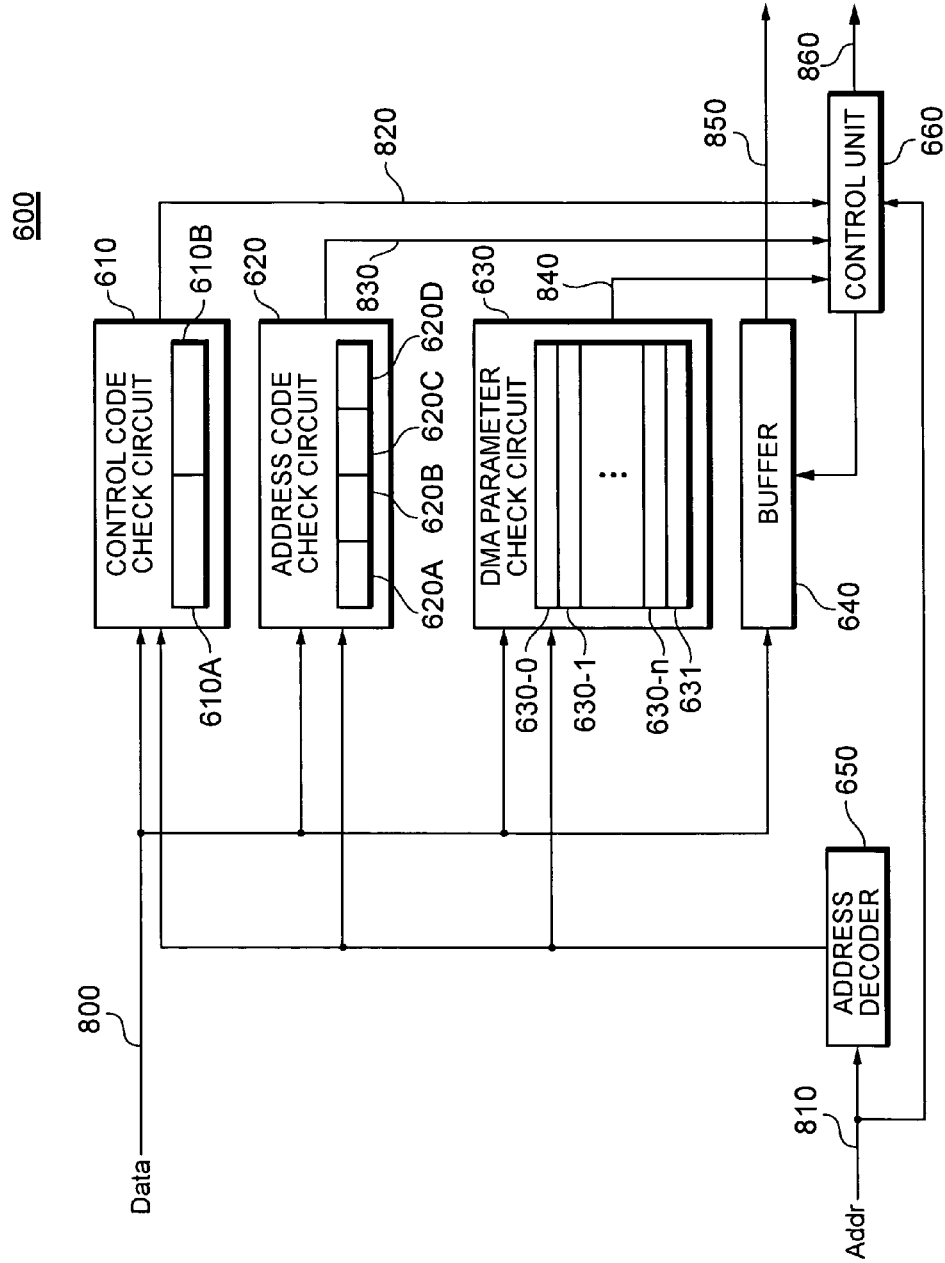
FIG. 9 is a diagram showing the hardware structure of a check circuit according to this embodiment.

The detailed structure of the check circuit 600 will be explained with reference to FIG. 9. The check circuit 600 is for checking whether or not the data (control codes, address codes, DMA parameters) transferred from the CPU 11 to the data controller 14 has been garbled.

The check circuit 600 includes a control code check circuit 610, address code check circuit 620, DMA parameter check circuit 630, buffer 640, address decoder 650, and control unit 660. Examples of the data transferred from the CPU 11 to data controller 14 include 32-bit control codes, 48-bit address codes (access destination addresses of the storage devices 51), and DMA parameters of 64-bit width (total size is unknown). These data are stored in any of the control code check circuit 610, address code check circuit 620 and DMA parameter check circuit 630; checked whether garbled or not; and stored in the buffer 640. If it is judged that the data is not garbled, it is read from the buffer 640.

When transferring a control code from the CPU 11 to the data controller 14, the CPU 11 generates an invert code made by inverting the logic value of the control code; attaches the invert code to the control code (see FIG. 8A)); and outputs it to the path 800 as a control code of 64 bits in total. The control code check circuit 610 receives the 64-bit control code with the inverse code from the path 800, stores the 32-bit control code in the register 610A, and stores the 32-bit inverse code in the register 610B.

The address decoder 650 judges the type of the data (distinction between a control code, address code or DMA parameter) output to the path 800 as a result of decoding the address (address of address register) output to the path 810. The control code check circuit 610 computes the exclusive OR of the control code stored in the register 610A and the inverse code stored in the register 610B, and thereby checks whether or not the control code has been garbled when passing through the path 800.

When the control code check circuit 610 has confirmed that the control code has not been garbled, it notifies the control unit 660 of that fact via the path 820. Having received that notification, the control unit 660 outputs the control code stored in the buffer 640 in the internal bus 850 in the data controller 14.

Meanwhile, if the control code check circuit 610 confirms that the control code has been garbled, it notifies the control unit 660 of that fact via the path 820. Having received that notification, the control unit 660 outputs an error signal to the path 860 connected to the inside of the data controller 14 and abandons the control code stored in the buffer 640.

When transferring an address code from the CPU 11 to data controller 14, the CPU 11 attaches a 16-bit SUM check code to the 48-bit address code (see FIG. 8B), and outputs them as the 64-bit address code to the path 800. The address code check circuit 620 receives the 64-bit control code with the inverse code from the path 800, stores the address code in the 16-bit registers 620A, 620B and 620C, and stores the SUM check code in the 16-bit register 620D.

The address decoder 650 judges the type of data (makes a distinction between a control code, address code and DMA parameter) output to the path 800, as a result of decoding the address (address of address register) output to the path 810. The address code check circuit 620 checks the SUM check code and thereby checks whether or not the address code has been garbled when passing through the path 800.

When the address check circuit 620 has confirmed that the address code has not been garbled, it notifies the control unit 660 of that fact via the path 830. Having received that notification, the control unit 660 outputs the address code stored in the buffer 640 to the internal bus 850 in the data controller 14.

Meanwhile, if the address code check circuit 620 confirms that the address code has been garbled, it notifies the control unit 660 of that fact via the path 830. Having received the notification, the control unit 660 outputs an error signal to the path 860 connected to the inside of the data controller 14 and abandons the address code stored in the buffer 640.

When transferring a DMA parameter from the CPU 11 to data controller 14, the CPU 11 attaches a 16-bit SUM check code or CRC code to a 48-bit DMA parameter (see FIG. 8C), and outputs them as a 64-bit DMA parameter to the path 800. The DMA parameter check circuit 630 receives the DMA parameter with the SUM check code or CRC code from the path 800, stores the DMA parameter in the 64-bit registers 630-0-630-$n$ and stores the SUM check code or CRC code in the 64-bit register 631.

The address decoder 650 judges the type of the data (makes a distinction between a control code, and DMA parameter) output to the path 800 as a result of decoding the address (address of the address register) output to the path 810. The DMA parameter check circuit 630 judges whether or not the DMA parameter has been garbled when passing through the path 800 by checking the SUM check code or CRC code.

When the DMA parameter check circuit 630 has confirmed that the DMA parameter has not been garbled, it notifies the control unit 660 of that fact via the path 840. Having received this notification, the control unit 660 outputs the DMA parameter stored in the buffer 640 to the internal bus 850 in the data controller 14.

Meanwhile, when the DMA parameter check circuit 630 confirms that the DMA parameter has been garbled, it notifies the control unit 660 of that fact via the path 840. Having received this notification, the control unit 660 outputs an error signal to the path 860 connected to the inside of the data controller 14 and abandons the DMA parameter stored in the buffer 640.

Modified examples of the storage system are explained with reference to FIGS. 10 to 12. The circuits given the same reference codes as those in FIG. 1 indicate the same circuits, so detailed explanations for them have been omitted.

Figure 10:
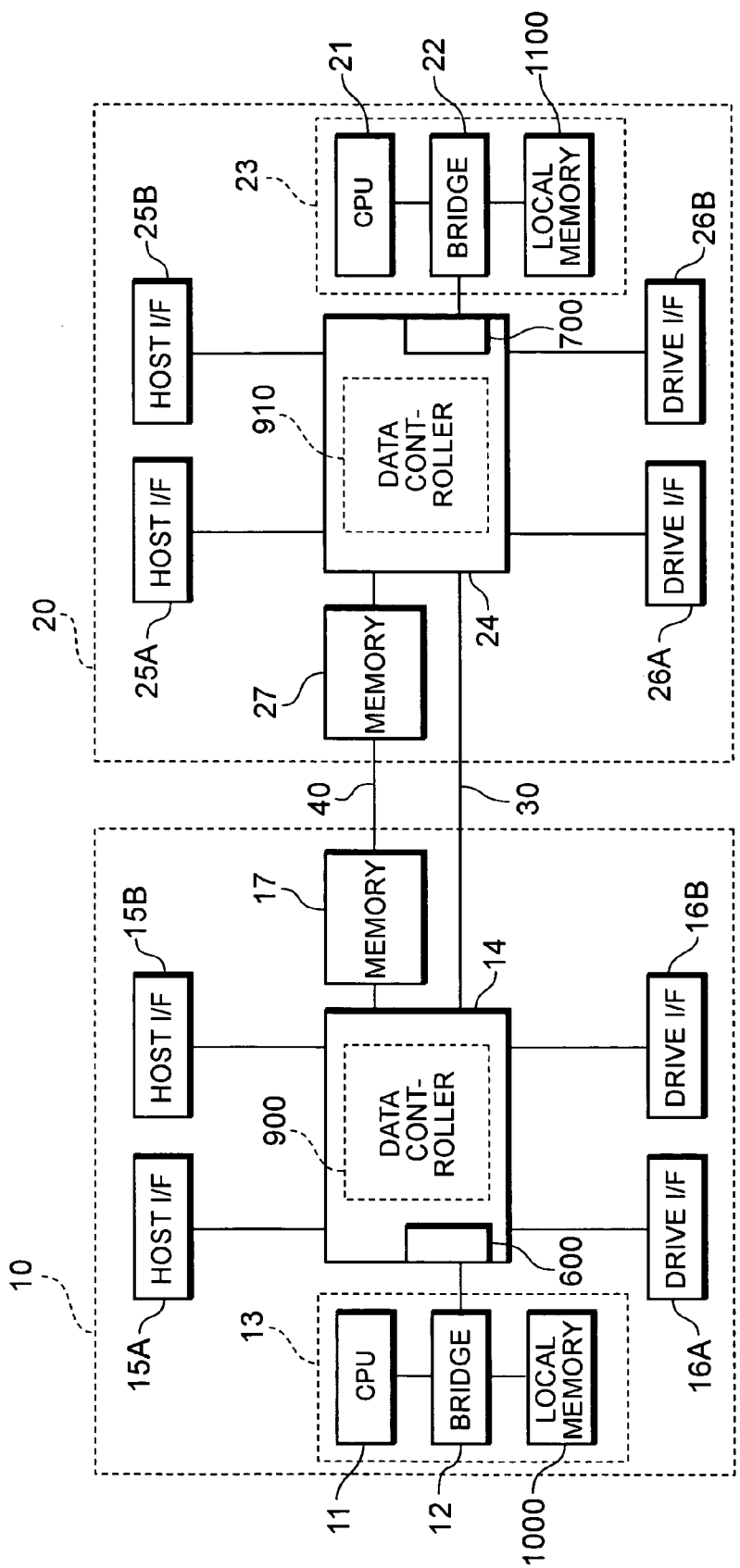
FIG. 10 is an explanatory diagram of a modified example of the storage system according to this embodiment.

The storage system 101 shown in FIG. 10 has: local memories 1000 and 1100 in the CPU units 13 and 23, respectively; and check circuits 600 and 700 and ring paths 900 and 910 in the data controller 14 and 24 respectively. The local memories 1000 and 1100 store control information. This structure enables the transmission of the control information between the controllers 10 and 20 through the path 40 between the memories 17 and 27, while maintaining the control information management method adopted in the conventional local memories 1000 and 1100, accordingly, realizing a system with excellent functionality.

Figure 11:
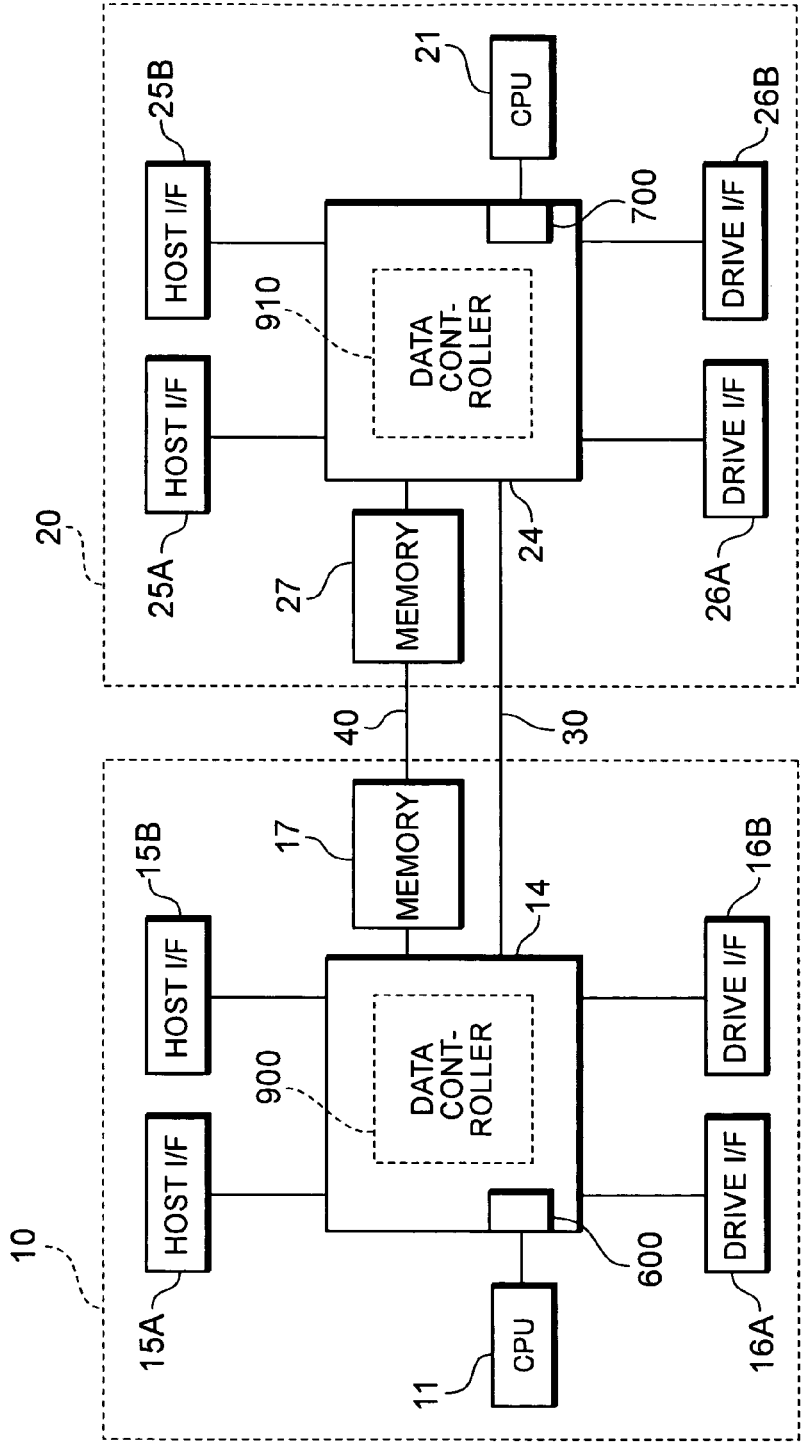
FIG. 11 is an explanatory diagram of another modified example of the storage system according to this embodiment.

The storage system 102 shown in FIG. 11 has a structure where the bridges 12 and 22 are deleted from the storage system 100 shown in FIG. 1. This structure enables the reduction of the space occupied by the CPU units and so realizing a space-saving board.

Figure 12:
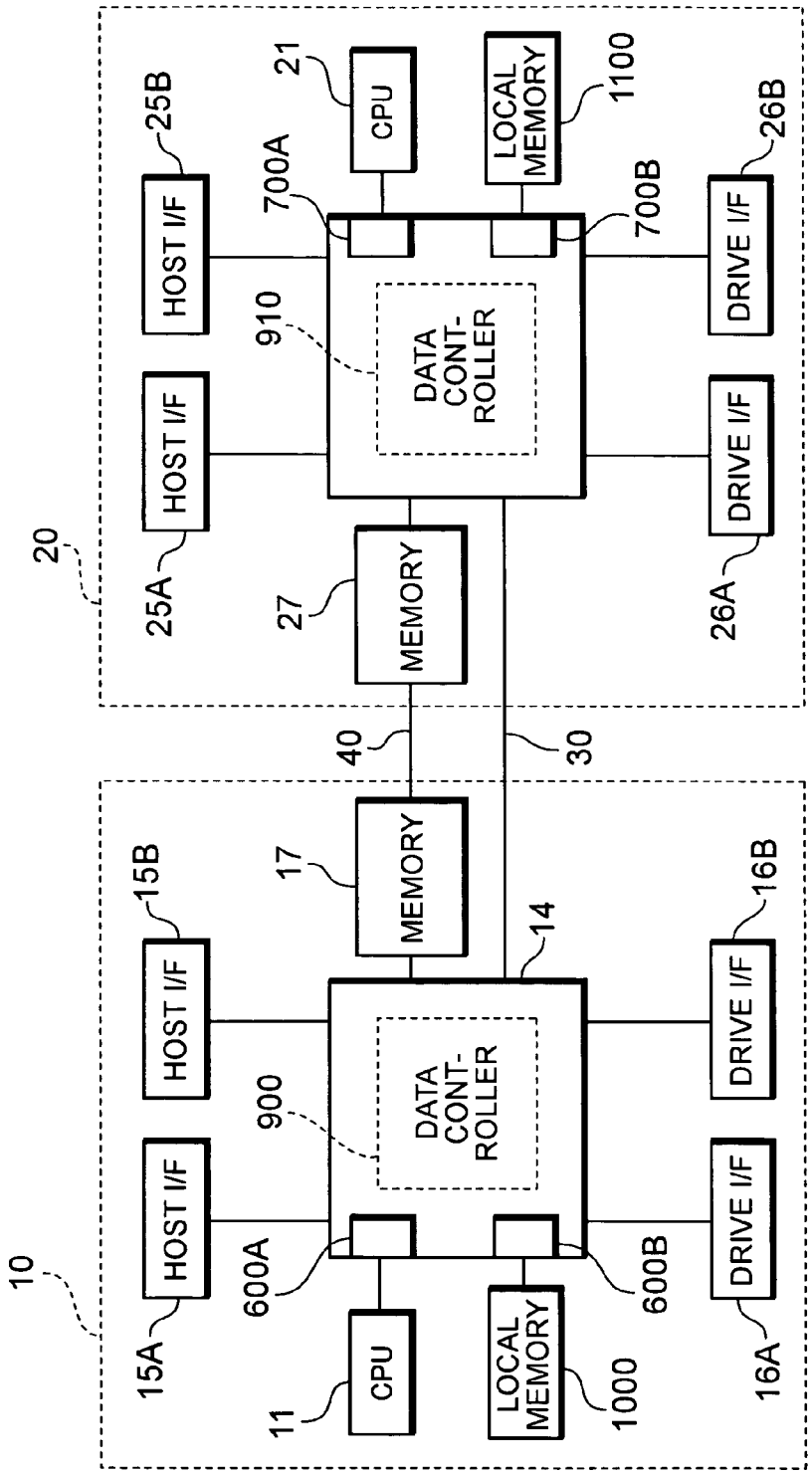
FIG. 12 is an explanatory diagram of another modified example of the storage system according to this embodiment.

The storage system 103 shown in FIG. 12 has the structure where the CPU 11 and local memory 1000 are directly connected to the data controller 14. The data controller 14 is equipped with check circuits 600A and 600B. The check circuit 600A checks whether or not control codes and address codes from the CPU 11 are garbled. The check circuit 600B checks whether or not DMA parameters from the local memory 1000 are garbled.

In this storage system 103, the CPU 21 and local memory 1100 are directly connected to the data controller 24. The data controller 24 is equipped with check circuits 700A and 700B. The check circuit 700A checks whether or not control codes and address codes from the CPU 21 are garbled. The check circuit 700B checks whether or not the DMA parameters from the local memory 1000 are garbled.

The check method used in the check circuits 600A and 700A is the same as that used in the control code check circuit 610 and address code check circuit 620. The check method used in the check circuits 600B and 700B is the same as that used in the DMA parameter check circuit 630.

Figure 13:
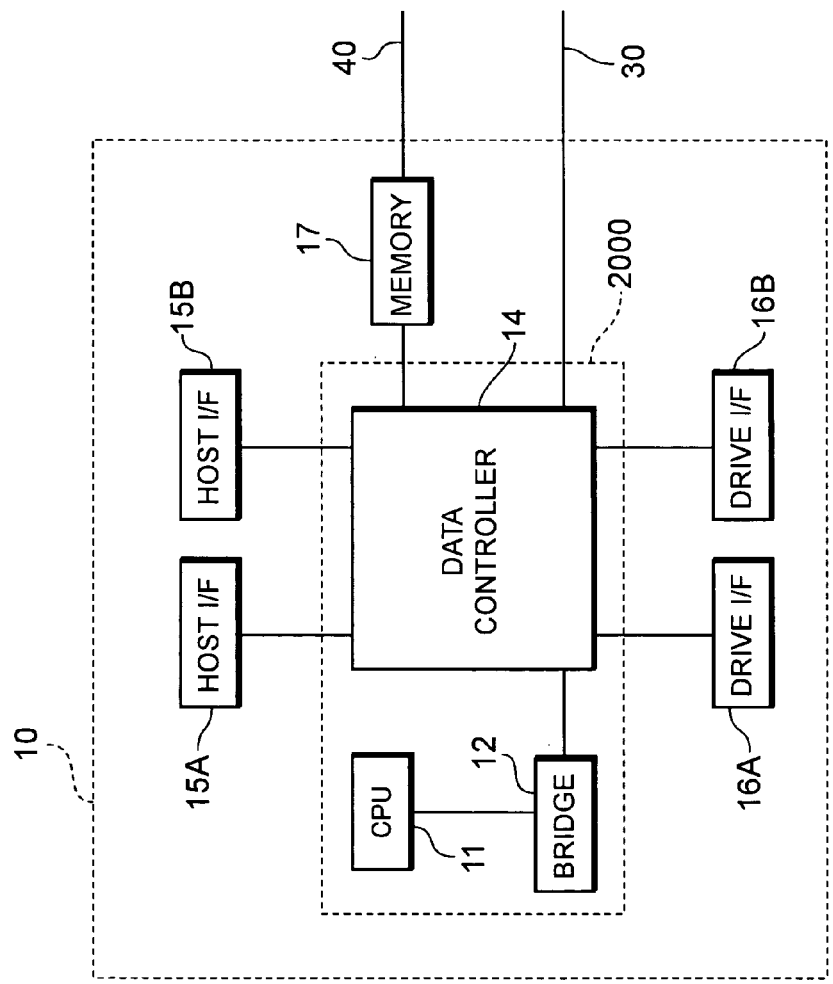
FIG. 13 is an explanatory diagram of the maintenance and management of the storage system according to this embodiment.
Figure 14:
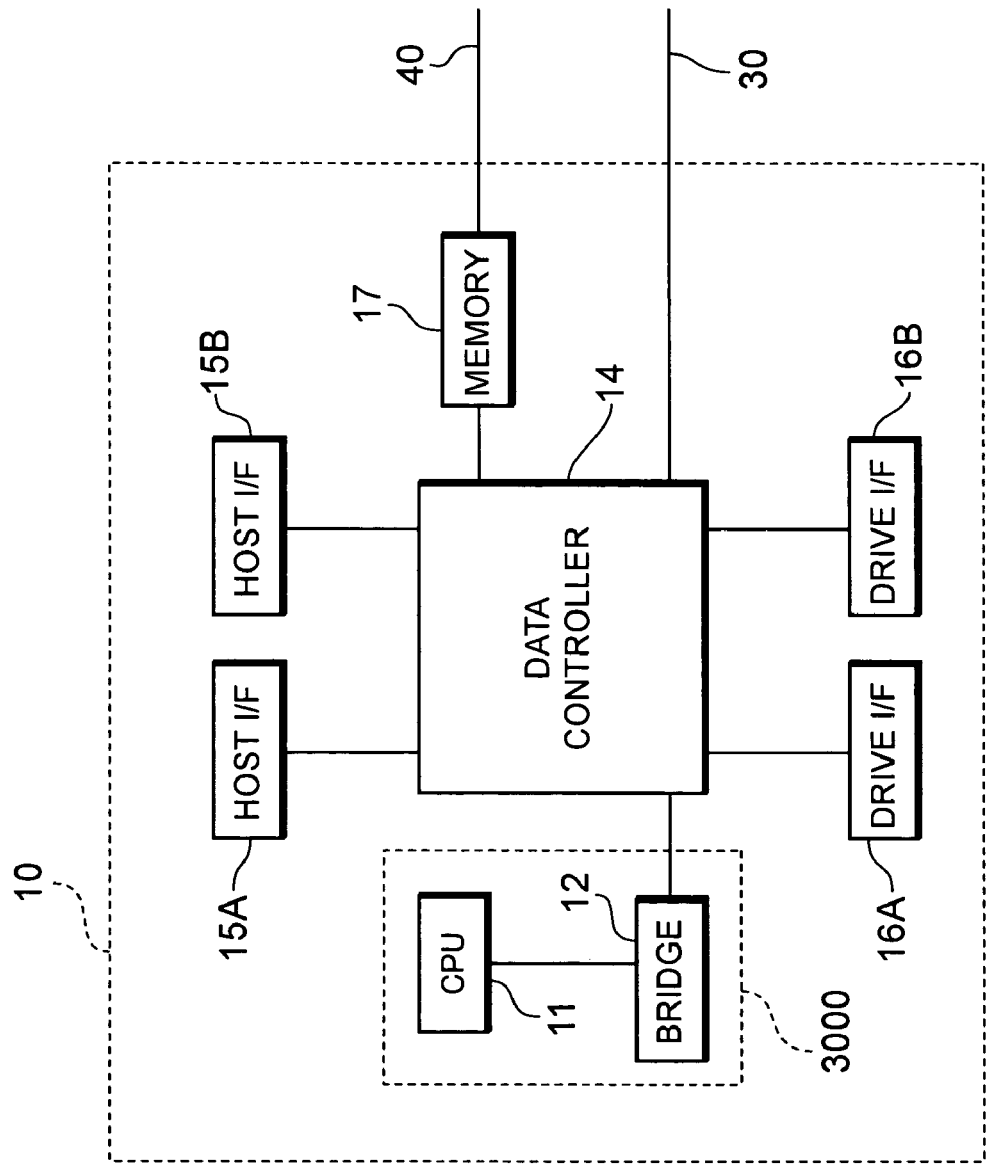
FIG. 14 is another explanatory diagram of the maintenance and management of the storage system according to this embodiment.

The maintenance and management of the storage system will be explained with reference to FIGS. 13 and 14. In the storage system according to this embodiment, the CPU 11, bridge 12 and data controller 14 are modularized into one multi chip module 2000 as shown in FIG. 13, or the CPU 11 and bridge 12 are modularized into one multi chip module 3000 as shown in FIG. 14.

Assume that a failure occurs in the controller 10 and the data controller 14 becomes inoperable. Once the failure occurs, the multi chip modules 2000 and 3000 are removed from the package and replaced by normal multi chip modules 2000 and 3000. Here, because the controller 20 is able to access the memory 17 through the path 40 and read the control information therein, the task the controller 10 was performing at the occurrence of the failure can be failed-over to the controller 20. Accordingly, the storage system keeps operating without halt even when a failure occurs in the controller 10.

The examples and applications described in the above embodiment of this invention may be combined, changed or modified as appropriate depending on intended use, and this invention is not limited to the descriptions in the foregoing embodiment. It is apparent in the scope of the claims of this invention that any combinations, changes and modifications are also included in the technical scope of this invention.

What is claimed is:

1. A storage system having a first controller and a second controller for controlling the reading/writing of data from/to a storage device in response to a request from a host computer, the first controller comprising a first memory for storing the data read/written from/to the storage device, and control information concerning the reading/writing of data from/to the storage device;

the second controller comprising a second memory for storing the data read/written from/to the storage device, and control information concerning the reading/writing of data from/to the storage device;

wherein the first memory is configured to be accessed from the second controller and the second memory is configured to be accessed from the first controller, and each of the first and second memories has at least three DIMMs daisy-chain connected to one another; wherein the first controller has a first data controller for controlling the transfer of data between a plurality of first peripheral devices inside the first controller;

the first data controller has a plurality of first logical blocks for controlling interfaces between the first peripheral devices and the first data controller;

each of the first logical blocks is point-to-point connected to only two adjacent first logical blocks on two opposite sides thereof, thereby forming a first ring path for transferring data;

the second controller has a second data controller for controlling the transfer of data between a plurality of second peripheral devices inside the second controller;

the second data controller has a plurality of second logical blocks for controlling interfaces between the second peripheral devices and the second data controller; and each of the second logical blocks is point-to-point connected to only two adjacent second logical blocks on two opposite sides thereof, thereby forming a second ring path for transferring data.

2. The storage system according to claim 1, wherein: the first memory has a first selector for selecting a controller to access the first memory from among the first controller and the second controller, in accordance with the presence or absence of a failure in the first controller; and the second memory has a second selector for selecting a controller to access the second memory from among the first controller and the second controller, in accordance with the presence or absence of a failure in the second controller.

3. The storage system according to claim 1,
wherein: the first data controller transfers data via the first ring path in either a clockwise direction or a counterclockwise direction that has a shorter transfer distance, if the direction with the shorter transfer distance is already engaged in transferring other data, the first data controller transfer said data via the other direction that does not have the shorter transfer distance, and the second data controller transfers data via the second ring path in either a clockwise direction or a counterclockwise direction that has a shorter transfer distance, if the direction with the shorter transfer distance is already engaged in transferring other data, the second data controller transfer said data via the other direction that does not have the shorter transfer distance.

4. The storage system according to claim 1, wherein: the first data controller has a plurality of first ring paths having different data transfer directions, and transfers data via one the first ring paths set with a clockwise direction or a counterclockwise direction that has a shortest transfer distance, and the second data controller has a plurality of second ring paths having different data transfer directions, and transfers data via one the second ring paths set with a clockwise direction or a counterclockwise direction that has a shortest transfer distance.

5. The storage system according to claim 1, wherein the first controller further comprising a first module having a first CPU and its peripheral devices, the first CPU controlling the reading/writing of data from/to the storage device in response to a request from the host computer;

the second controller further comprising a second module having a second CPU and its peripheral devices, the second CPU controlling the reading/writing of data from/to the storage device in response to a request from the host computer;

wherein, when a failure occurs in the first controller, the second controller accesses the first memory after the first module is removed, and wherein, when a failure occurs in the second controller, the first controller accesses the second memory after the second module is removed.

6. The storage system according to claim 1,
wherein: the first controller has: a first CPU for controlling the reading/writing of data from/to the storage device in response to a request from the host computer; and a first data controller for controlling the transfer of data between a plurality of first peripheral devices in the first controller, the first data controller has a first check circuit for checking whether or not the data transferred from the first CPU to the first data controller is garbled, the second controller has: a second CPU for controlling the reading/writing of data from/to the storage device in response to a request from the host computer; and a second data controller for controlling the transfer of data between a plurality of second peripheral devices in the second controller, and the second data controller has a second check circuit for checking whether or not the data transferred from the second CPU to the second data controller is garbled.

7. A method for controlling a storage system that has a first controller for controlling the reading/writing of data from/to a storage device according to a request from a host computer, the first controller having a first memory for storing the data read/written from/to the storage device and control information concerning the reading/writing of data from/to the storage device; and a second controller for controlling the reading/writing of data from/to the storage device according to a request from the host computer, the second controller having a second memory for storing the data read/written from/to the storage device and control information concerning the reading/writing of data from/to the storage device, said method comprising the steps of: configuring the first memory to be accessed from the second controller and configuring the second memory to be accessed from the first controller;

daisy-chain connecting at least three DIMMs provided in each of the first and second memories to provide a ring path respectively;

detecting the occurrence of a failure in the first controller; and the second controller accessing the first memory in place of the first controller and performing the task the first controller was performing;

wherein: the first controller has a first data controller for controlling the transfer of data between a plurality of first peripheral devices inside the first controller;

the first data controller has a plurality of first logical blocks for controlling interfaces between the first peripheral devices and the first data controller;

each of the first logical blocks is point-to-point connected to only two adjacent first logical blocks on two opposite sides thereof, thereby forming a first ring path for transferring data;

the second controller has a second data controller for controlling the transfer of data between a plurality of second peripheral devices inside the second controller;

the second data controller has a plurality of second logical blocks for controlling interfaces between the second peripheral devices and the second data controller; and each of the second logical blocks is point-to-point connected to only two adjacent second logical blocks on two opposite sides thereof, thereby forming a second ring path for transferring data.

8. The method according to claim 7, further comprising: transferring by the first data controller data via the first ring path in either a clockwise direction or a counterclockwise direction that has a shorter transfer distance;

if the direction with the shorter transfer distance is already engaged in transferring other data, transferring by the first data controller said data via the other direction that does not have the shorter transfer distance;

transferring by the second data controller data via the second ring path in either a clockwise direction or a counterclockwise direction that has a shorter transfer distance; and if the direction with the shorter transfer distance is already engaged in transferring other data, transferring by the second data controller said data via the other direction that does not have the shorter transfer distance.

9. The method according to claim 7, wherein the first data controller has a plurality of first ring paths having different data transfer directions, and the second data controller has a plurality of second ring paths having different data transfer directions, said method further comprising:

transferring by the first data controller data via one the first ring paths set with a clockwise direction or a counterclockwise direction that has a shortest transfer distance; and transferring by the second data controller data via one the second ring paths set with a clockwise direction or a counterclockwise direction that has a shortest transfer distance.

* * * * *